US008449102B2

(12) United States Patent  (10) Patent No.: US 8,449,102 B2
Breton et al.  (45) Date of Patent: May 28, 2013

(54) CURABLE SOLID INKS FOR RAISED PRINT APPLICATIONS AND METHODS FOR USING THE SAME

(75) Inventors: Marcel P. Breton, Mississauga (CA); Michelle N. Chretien, Mississauga (CA); Barkev Keoshkerian, Thornhill (CA); Jennifer L. Belelie, Oakville (CA); Naveen Chopra, Oakville (CA)

(73) Assignee: Xerox Corporation, Norwalk, CT (US)

( * ) Notice: Subject to any disclaimer, the term of this patent is extended or adjusted under 35 U.S.C. 154(b) by 252 days.

(21) Appl. No.: 12/972,138

(22) Filed: Dec. 17, 2010

(65) Prior Publication Data
US 2012/0154496 A1 Jun. 21, 2012

(51) Int. Cl.
B41J 2/01 (2006.01)
(52) U.S. Cl.
USPC .......................................... 347/102; 347/100
(58) Field of Classification Search
USPC .......................................... 347/102
See application file for complete search history.

(56) References Cited

U.S. PATENT DOCUMENTS

| | | | |
|---|---|---|---|
| 4,490,731 A | 12/1984 | Vaught | |
| 5,195,430 A | 3/1993 | Rise | |
| 5,231,135 A | 7/1993 | Machell et al. | |
| 5,389,958 A | 2/1995 | Bui et al. | |
| 5,621,022 A | 4/1997 | Jaeger et al. | |
| 5,782,966 A | 7/1998 | Bui et al. | |
| 6,221,137 B1 | 4/2001 | King et al. | |
| 6,309,453 B1 | 10/2001 | Banning et al. | |
| 6,472,523 B1 | 10/2002 | Banning et al. | |
| 6,476,219 B1 | 11/2002 | Duff et al. | |
| 6,576,747 B1 | 6/2003 | Carlini et al. | |
| 6,576,748 B1 | 6/2003 | Carlini et al. | |
| 6,590,082 B1 | 7/2003 | Banning et al. | |
| 6,646,111 B1 | 11/2003 | Carlini et al. | |
| 6,663,703 B1 | 12/2003 | Wu et al. | |
| 6,673,139 B1 | 1/2004 | Wu et al. | |
| 6,696,552 B2 | 2/2004 | Mayo et al. | |
| 6,713,614 B2 | 3/2004 | Carlini et al. | |
| 6,726,755 B2 | 4/2004 | Titterington et al. | |
| 6,755,902 B2 | 6/2004 | Banning et al. | |
| 6,821,327 B2 | 11/2004 | Jaeger et al. | |
| 6,958,406 B2 | 10/2005 | Banning et al. | |
| 7,053,227 B2 | 5/2006 | Jaeger et al. | |
| 7,186,762 B2 | 3/2007 | Wong et al. | |
| 7,279,587 B2 | 10/2007 | Odell et al. | |
| 7,381,831 B1 | 6/2008 | Banning et al. | |
| 7,427,323 B1 | 9/2008 | Birau et al. | |
| 2007/0120910 A1 | 5/2007 | Odell et al. | |
| 2008/0218540 A1* | 9/2008 | Iftime et al. | ........................ 347/8 |
| 2010/0053287 A1 | 3/2010 | Belelie et al. | |
| 2011/0152397 A1* | 6/2011 | Breton et al. | .................... 522/42 |

OTHER PUBLICATIONS

U.S. Appl. No. 12/642,538, filed Dec. 18, 2009, Breton et al.
U.S. Appl. No. 12/704,194, filed Feb. 11, 2010, Breton et al.

* cited by examiner

Primary Examiner — Omar Rojas
(74) Attorney, Agent, or Firm — Pillsbury Winthrop Shaw Pittman LLP

(57) ABSTRACT

Curable solid inks and low shrinkage curable solid inks which are solid at room temperature and molten at an elevated temperature at which the molten ink is applied to a substrate. In particular, the solid inks of the present embodiments retain the advantages of handling, safety, and print quality usually associated with conventional solid phase change inks but provide additional breakthrough performance characteristics such as enhanced robustness, lower jetting temperature, and ultra-low shrinkage upon crystallization, which allow the inks to be used as novel materials in inkjet-based Braille and raised print applications.

10 Claims, 6 Drawing Sheets

CURABLE SOLID INKS FOR RAISED PRINT APPLICATIONS AND METHODS FOR USING THE SAME

CROSS REFERENCE TO RELATED APPLICATIONS

Reference is made to commonly owned and co-pending, U.S. patent application to Breton et al., filed the same day as the present application, entitled, "Curable Phase Change Inks" Ser. No. 12/971,467, the entire disclosure of which are incorporated herein by reference in its entirety.

BACKGROUND

The present embodiments relate to solid phase change ink compositions characterized by being solid at room temperature and molten at an elevated temperature at which the molten ink is applied to a substrate. These solid ink compositions can be used for ink jet printing in a variety of applications. The present embodiments are directed to curable solid inks (CSI) and low shrinkage curable solid inks (LS-CSI) and methods of using the inks. The solid inks of the present embodiments have a unique combination of characteristics, such as enhanced robustness, lower jetting temperature, and ultra-low shrinkage upon crystallization, that allow the inks to be used as novel materials in inkjet-based Braille and raised print applications.

Ink jet printing processes generally may employ inks that are solid at room temperature and liquid at elevated temperatures. Such inks may be referred to as solid inks, hot melt inks, phase change inks and the like. For example, U.S. Pat. No. 4,490,731, the disclosure of which is totally incorporated herein by reference, discloses an apparatus for dispensing solid ink for printing on a recording medium such as paper. In thermal ink jet printing processes employing hot melt inks, the solid ink is melted by the heater in the printing apparatus and utilized (jetted) as a liquid in a manner similar to that of conventional thermal ink jet printing. Upon contact with the printing recording medium, the molten ink solidifies rapidly, allowing the colorant to substantially remain on the surface of the recording medium instead of being carried into the recording medium (for example, paper) by capillary action, thereby enabling higher print density than is generally obtained with liquid inks. Advantages of a solid ink in ink jet printing are thus elimination of potential spillage of the ink during handling, a wide range of print density and quality, minimal paper cockle or distortion, and enablement of indefinite periods of nonprinting without the danger of nozzle clogging, even without capping the nozzles.

Solid inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in solid ink jet printers wherein the ink droplets are applied directly onto the final recording medium (for example, paper, transparency material, and the like), the droplets solidify immediately upon contact with the recording medium, so that migration of ink along the printing medium is prevented and dot quality is improved.

While the above conventional solid ink technology is generally successful in producing vivid images and providing economy of jet use and substrate latitude on different substrates, such technology often does not meet the additional requirements for specialized applications such as Braille and raised print applications. There are two main technologies available for printing Braille and raised characters: embossing and thermal paper expansion. Neither is easily adapted to producing digital prints and a simple solution for digital generation of Braille and raised text is desired, particularly by government and large institutions which are required by law to provide Braille prints for visually impaired people. In addition, packaging converters are being increasingly asked and mandated, particularly in Canada and the European Union, to provide Braille printing on packages for the pharmaceutical industry. U.S. Patent Publication No. 2010/0053287, hereby incorporated by reference, previously demonstrated the use of solid inkjet printer with optional raised print capability. While raised prints could be obtained, however, the markings made with solid ink were insufficiently robust and thus required special handling.

As such, there is a need to overcome the deficiencies of conventional solid ink technology for these applications to better serve the market. Advantages of digitally producing Braille and raised text are personalization, accessibility to home users, ease of combination with regular text, and the ability to easily generate Braille representations of mathematical and chemical equations and financial formulae.

Each of the foregoing U.S. patents and patent Publications are incorporated by reference herein. Further, the appropriate components and process aspects of the each of the foregoing U.S. patents and patent Publications may be selected for the present disclosure in embodiments thereof.

SUMMARY

According to embodiments illustrated herein, there is provided novel solid ink compositions comprising amorphous materials synthesized from citric acid suitable for ink jet printing, including applications requiring high or varying levels of gloss.

In particular, the present embodiments provide a curable solid ink comprising: an ink vehicle; one or more waxes; and a photoinitiator, wherein the curable solid ink has a hardness after curing of greater than 70, a shrinkage value of less than 5 and a pre-cure hardness greater than 5 and less than 50.

In further embodiments, there is provided an ink jet printing device comprising: an ink jet print head and a print region surface toward which ink is jetted from the ink jet print head, wherein a height distance between the ink jet print head and the print substrate is adjustable; and further wherein the ink jet print head jets a curable solid ink comprising an ink vehicle, one or more waxes, and a photoinitiator, wherein the curable solid ink has a hardness after curing of greater than 70, a shrinkage value of less than 5, and a pre-cure hardness greater than 5 and less than 50; and further wherein a print deposited upon the print substrate is Braille, digital embossing raised print, or a combination of regular print and one or more of Braille, digital embossing and raised print.

In yet other embodiments, there is provided a method of jet printing raised text, comprising: jetting a curable solid ink onto a print substrate to form an image comprising raised text; and exposing the image to radiation having wavelengths in the range of from about 4 nanometers to about 500 nanometers to cure the curable solid ink on to the print substrate, wherein the curable solid ink comprises: an ink vehicle, one or more waxes, and a photoinitiator, wherein the curable solid ink has a hardness after curing of greater than 70, a shrinkage value of less than 5 and a pre-cure hardness greater than 5 and less than 50.

BRIEF DESCRIPTION OF THE DRAWINGS

For a better understanding of the present embodiments, reference may be had to the accompanying figures.

DETAILED DESCRIPTION

Figure 1:
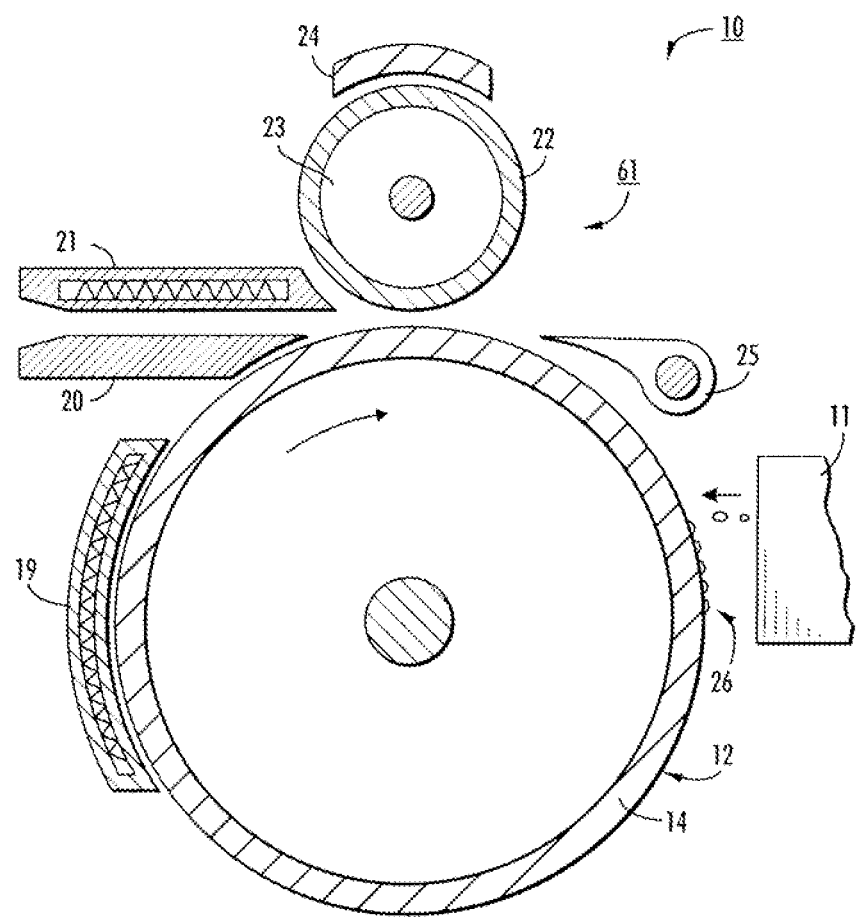
FIG. 1 is a side view of one apparatus for use in conjunction with the present embodiments.

In the following description, it is understood that other embodiments may be utilized and structural and operational changes may be made without departure from the scope of the present embodiments disclosed herein.

Solid ink technology broadens printing capability and customer base across many markets, and the diversity of printing applications will be facilitated by effective integration of printhead technology, print process and ink materials. The solid ink compositions are characterized by being solid at room temperature and molten at an elevated temperature at which the molten ink is applied to a substrate. As discussed above, while current ink options are successful for printing on various substrates, these options are not always satisfactory for certain applications such as raised print applications. Previous attempts to use solid ink as a material to generate Braille and raised text images determined that the resultant images were much too fragile for practical use.

The present embodiments are directed curable solid inks (CSI) and low shrinkage curable solid inks (LS-CSI), as disclosed in U.S. patent application Ser. Nos. 12/642,538 and 12/704,194, both to Breton et al., which are hereby incorporated by reference in their entireties. In particular, the present embodiments provide curable solid inks and low shrinkage curable solid inks having a unique combination of characteristics for use as novel materials in inkjet-based Braille and raised print applications.

Generally, a curable solid ink is not known to be suitable for raised print applications. There are a number of requirements that are specific to printing raised prints that are not generally provided by curable solid inks, such as good adhesion of the ink to itself to facilitate multilayer printing, sufficient pre-cure hardness to provide high definition printing to heights required for Braille with minimal number of layers, hardness after curing and high curing efficiency despite the thick layers required for Braille, and finally minimal shrinkage. Of all these requirements, pre-cure hardness is especially important since the ink will not retain the aspect ratio required for Braille printing or will be sensitive to variations in environment conditions if too soft. The result is poor repeatability of printing.

The solid inks of the present embodiments retain the advantages of handling, safety, and print quality usually associated with solid phase change inks but provide additional breakthrough performance characteristics such as enhanced robustness, lower jetting temperature, and ultra-low shrinkage upon crystallization. For example, prepared ink compositions of the present embodiments had measured viscosities in the range of less than 10 cPs, or from about 5 to about 15 cPs, at 90° C., a shrinkage value of less than 5, a pre-cure hardness from about 5 to about 50, and a hardness after curing that was much higher than conventional solid inks (e.g., ColorQube from Xerox Corp. (Norwalk, Conn.)). All these characteristics allow the solid inks to meet the requirements for various raised print applications, including Braille, digital embossing, raised print or a combination of regular print and one or more of Braille, digital embossing and raised print.

The present embodiments comprise blends of waxes, resins, monomers, curable waxes, optional colorants, and free-radical photoinitiators, all of which are solid below about 40° C. with little or no smell. These components were selected to achieve jetting at temperatures in the range of from about 60 to about 100° C., or from about 65 to about 90° C., or from about 70 to about 85° C. These solid inks for the Braille/raised print formulations have robust jetting at elevated temperatures (viscosity of from about 10 to about 15 cPs) of from about 70 to about 95° C. and mechanical stability equivalent to wax at ambient substrate temperatures (i.e., room temperature). The solid inks of the present embodiments are solid at room temperature which prevents spread or migration of the printed droplet and allows for facile fabrication of the Braille or raised print markings. After printing, the markings are cured to provide robust structures which far exceed the robustness of any Braille printing technology on the market today.

In the present embodiments, there is provided a curable solid ink comprising an ink vehicle, a curable wax, a non-curable wax and a photoinitiator, wherein the curable solid ink has a hardness after curing of greater than 70 and a shrinkage value of less than 5 The curable solid ink may, in embodiments, further include a colorant. In further embodiments, the curable solid ink has a hardness after curing of from about 70 to about 85 or from about 75 to about 90. In further embodiments, the curable solid ink has a viscosity of less than 10 cPs at 90° C. The curable solid ink has jettable viscosities of from about 5 to about 20 cPs at above 70° C., or more specifically, at from about 70 to about 100° C. In embodiments, the curable solid ink has a pre-cure hardness greater than 5 and less than 50. This is in contrast to curable gel inks which have pre-cure hardness less than 5 and solid inks which have hardness greater than 60.

In specific embodiments, the ink vehicle may be present in the curable solid ink in an amount of from about 55 to about 95 percent by weight of the total weight of the curable solid ink. The curable wax may be present in the curable solid ink in an amount of from about 1 to about 15 percent by weight of the total weight of the curable solid ink, and the non-curable wax may be present in the curable solid ink in an amount of from about 20 to about 50 percent by weight of the total weight of the curable solid ink. The photoinitiator blend which may include up to four different photoinitiators and in some embodiments more than four different photoinitiators may be present in the curable solid ink in a total amount of from about 0.5 to about 8 percent by weight of the total weight of the curable solid ink.

In the present embodiments, there is further provided a method of using the curable solid ink for jet printing raised text. In such embodiments, the method comprises jetting a curable solid ink onto an intermediate substrate to form an intermediate image comprising raised text, transferring the intermediate image onto a substrate to form a transferred image comprising raised text, and exposing the transferred image to radiation having wavelengths in the range of from about 4 nanometers to about 500 nanometers to cure the curable solid ink. In embodiments, the jetting step is performed at above 70° C., or at from about 70 to about 100° C. The method of the present embodiments can be employed for Braille or digital embossing. In such specific applications, the raised text can be printed to meet certain parameters. For example, the raised text may be printed to have a height of at least about 0.508, or from about 0.1 to about 0.8 mm.

Any suitable printing device may used herein. In one embodiment, the apparatus is an ink jet printing device as described in commonly assigned, co-pending U.S. Patent Publication No. 2008/0218540, incorporated by reference in its entirety, that includes at least an ink jet print head and a print region surface toward which ink is jetted from the ink jet print head, wherein a height distance between the ink jet print head and the print region surface is adjustable.

The apparatus, as well as the methods herein, may be employed with any desired printing system and marking material suitable for applying a marking material in an imagewise pattern to an intermediate transfer member or directly to an image receiving substrate, such as thermal ink jet printing (both with inks liquid at room temperature and with phase change inks), piezoelectric ink jet printing (both with inks liquid at room temperature and with phase change inks), acoustic ink jet printing (both with inks liquid at room temperature and with phase change inks), thermal transfer printing, gravure printing, electrostatographic printing methods (both those employing dry marking materials and those employing liquid marking materials), and the like. For the purpose of illustration, a piezoelectric phase change ink jet printer for applying marking material in an imagewise pattern to an intermediate transfer member is described.

FIG. 1 is an illustration of an example of a suitable imaging apparatus 10 for forming an image on an intermediate transfer member and subsequently transferring that image from the intermediate transfer member to a final image receiving substrate. The illustrated imaging apparatus 10 includes an intermediate transfer member 14. A marking material applicator, in this case an ink jet head, 11 applies marking material in an imagewise pattern 26 onto the surface 12 of the intermediate transfer member. This surface 12 is a print region surface toward which the ink jet head 11 jets the marking material in forming an image. In this illustrated case, the print region surface is the intermediate transfer member surface.

As also shown in FIG. 1, the apparatus may also include a transferring apparatus 61 including, for example, a transfer roll 22 where the imagewise pattern of marking material from the intermediate transfer member surface is transferred onto an image receiving substrate 18. An optional image receiving substrate guide 20 may be used to pass the image receiving substrate from a feed device (not shown) and guide the substrate through the nip formed by the opposing arcuate surfaces of the roll 22 and the intermediate transfer member 14. Optional stripper fingers 25 may be mounted to the imaging apparatus 10 to assist in removing the image receiving substrate from the surface of the intermediate transfer member 14. Roll 22 may have a metallic core 23, such as steel, with an elastomeric covering such as, for example, urethanes, nitrites, ethylene propylene diene monomer rubber (EPDM), and other appropriately resilient materials. Fusing of the image on the image receiving substrate may also be effected at this transferring apparatus. Once the image 26 enters the nip, it is transferred to its final image conformation and adheres or is fixed to the image receiving substrate either by the pressure exerted against the image 26 on the substrate 18 by the roll 22 alone, or by the combination of the pressure and heat supplied by optional heater 21 and/or optional heater 19. Optional heater 24 may also be employed to supply heat to facilitate the process at this point. Once adhered and/or fused to the image receiving substrate, the image is cooled to ambient temperature, for example from about 22 to about 27° C.

Figure 2:
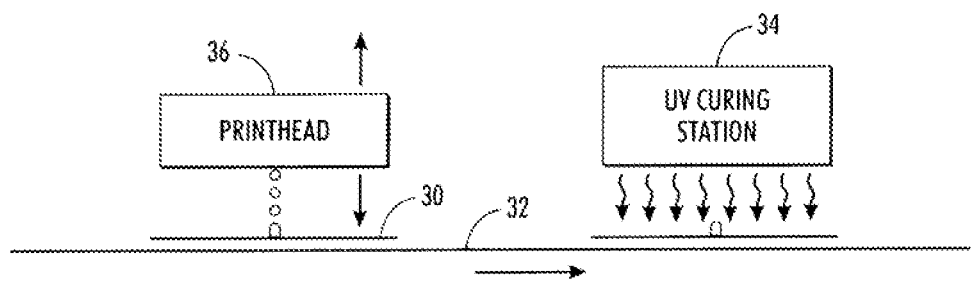
FIG. 2 is a schematic depiction of an embodiment including depositing the present marking material directly to a substrate according to the present embodiments.

However, in embodiments wherein the marking material is jetted from a printhead 36 directly to an image receiving substrate 30 such as paper, the print region surface would be the surface of the image receiving substrate 30, as shown in FIG. 2. The substrate 30 can then move along belt 32 in the direction shown by the single arrow toward the UV curing station 34 where the printed image is cured. Various embodiments are contemplated herein including comprising, for example, multiple passes through a single printing and curing station, several printing and curing stations disposed successively in turn, among others.

Radiation curable inks generally comprise at least one curable monomer, a gellant, a colorant, and a radiation activated initiator, specifically a photoinitiator, that initiates polymerization of curable components of the ink, specifically of the curable monomer. U.S. Pat. No. 7,279,587 to Odell et at, the disclosure of which is totally incorporated herein by reference, discloses photoinitiating compounds useful in curable solid ink compositions. U.S. Patent Publication 2007/0120910 to Odell et al., which is hereby incorporated by reference herein in its entirety, describes, in embodiments, a solid ink comprising a colorant, an initiator, and an ink vehicle.

In specific embodiments, the ink vehicles disclosed herein can comprise any suitable curable monomer or prepolymer. Examples of suitable materials include radically curable monomer compounds, such as acrylate and methacrylate monomer compounds, which are suitable for use as phase change ink carriers. Specific examples of relatively nonpolar acrylate and methacrylate monomers include (but are not limited to) isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, and the like, as well as mixtures and combinations thereof. In addition, multifunctional acrylate and methacrylate monomers and oligomers can be included in the phase change ink carrier as reactive diluents and as materials that can increase the crosslink density of the cured image, thereby enhancing the toughness of the cured images. Examples of suitable multifunctional acrylate and methacrylate monomers and oligomers include (but are not limited to) pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl) isocyanurate triacrylate, propoxylated neopentyl glycol diacrylate (available from Sartomer Co. Inc. as SR 9003), hexanediol diacrylate, tripropylene glycol diacrylate, dipropylene glycol diacrylate, amine modified polyether acrylates (available as PO 83 F, LR 8869, and/or LR 8889 (all available from BASF Corporation), trimethylolpropane triacrylate, glycerol propoxylate triacrylate, dipentaerythritol pentaacrylate, dipentaerythritol hexaacrylate, ethoxylated pentaerythritol tetraacrylate (available from Sartomer Co. Inc. as SR 494), and the like, as well as mixtures and combinations thereof. When a reactive diluent is added to the ink carrier material, the reactive diluent is added in any desired or effective amount, for example, from about 1 percent to about 80 percent by weight of the carrier, or from about 35 percent to about 70 percent by weight of the carrier, although the amount of diluent can be outside of these ranges.

In specific embodiments, the ink vehicles disclosed herein can comprise any suitable photoinitiator. Examples of specific initiators include, but are not limited to, Irgacure® 127, Irgacure® 379, and Irgacure® 819, all commercially available from Ciba Specialty Chemicals, among others. Further examples of suitable initiators include (but are not limited to) benzophenones, benzophenone derivatives, benzyl ketones, α-alkoxy benzyl ketones, monomeric hydroxyl ketones, polymeric hydroxyl ketones, α-amino ketones, alkoxy ketones, acyl phosphine oxides, metallocenes, benzoin ethers, benzil ketals, α-hydroxyalkylphenones, α-aminoalkylphenones, acylphosphine photoinitiators sold under the trade designations of IRGACURE® and DAROCUR® from Ciba, and the like. Specific examples include 1-hydroxy-cyclohexylphenylketone, benzophenone, 2-benzyl-2-(dimethylamino)-1-(4-(4-morphorlinyl)phenyl)-1-butanone, 2-methyl-1-(4-methylthio)phenyl-2-(4-morphorlinyl)-1-propanone, diphenyl-(2,4,6-trimethylbenzoyl) phosphine oxide, phenyl bis(2,4,6-trimethylbenzoyl) phosphine oxide, benzyl-dimethylketal, isopropylthioxanthone, 2,4,6-trimethylbenzoyldiphenylphosphine oxide (available as BASF LUCIRIN® TPO), 2,4,6-trimethylbenzoylethoxyphenylphosphine oxide (available as BASF LUCIRIN® TPO-L), bis(2,4,6-trimethylbenzoyl)-phenyl-phosphine oxide (available as Ciba IRGACURE® 819) and other acyl phosphines, 2-methyl-1-(4-methylthio)phenyl-2-(4-morphorlinyl)-1-propanone (available as Ciba IRGACURE® 907) and 1-(4-(2-hydroxyethoxy)phenyl)-2-hydroxy-2-methylpropan-1-one (available as Ciba IRGACURE® 2959), 2-benzyl 2-dimethylamino-1-(4-morpholinophenyl) butanone-1 (available as Ciba IRGACURE® 369). 2-hydroxy-1-(4-(4-(2-hydroxy-2-methylpropionyl)-benzyl)-phenyl-2-methyl-propan-1-one (available as Ciba IRGACURE® 127), 2-dimethylamino-2-(4-methylbenzyl)-1-(4-morpholin-4-ylphenyl)-butanone (available as Ciba IRGACURE® 379), titanocenes, isopropylthioxanthone, 1-hydroxy-cyclohexylphenylketone, benzophenone, 2,4,6-trimethylbenzophenone, 4-methylbenzophenone, diphenyl-(2,4,6-trimethylbenzoyl) phosphine oxide, 2,4,6-trimethylbenzoylphenylphosphinic acid ethyl ester, oligo(2-hydroxy-2-methyl-1-(4-(1-methylvinyl)phenyl) propanone), 2-hydroxy-2-methyl-1-phenyl-1-propanone, benzyl-dimethylketal, arylsulphonium slats, aryl iodonium salt, and the like, as well as mixtures thereof.

Optionally, the phase change inks can also contain an amine synergist, which are co-initiators which can donate a hydrogen atom to a photoinitiator and thereby form a radical species that initiates polymerization, and can also consume dissolved oxygen, which inhibits free-radical polymerization, thereby increasing the speed of polymerization. Examples of suitable amine synergists include (but are not limited to) ethyl-4-dimethylaminobenzoate, 2-ethylhexyl-4-dimethylaminobenzoate, and the like, as well as mixtures thereof.

Initiators for inks disclosed herein can absorb radiation at any desired or effective wavelength, for example, from about 4 nanometers to about 560 nanometers, or from about 200 nanometers to about 560 nanometers, or from about 200 nanometers to about 420 nanometers, although the wavelength can be outside of these ranges.

Optionally, the photoinitiator is present in the phase change ink in any desired or effective amount, for example from about 0.5 percent to about 15 percent by weight of the ink composition, or from about 1 percent to about 10 percent by weight of the ink composition, although the amount can be outside of these ranges.

The curable monomer or prepolymer and curable wax together can form more than about 50 percent, or at least 60 percent, or at least 80 percent by weight of the ink. By using a combination of solid curable monomers that can solidify prior to cure, there is generally no need to use a gellant and the pre-cure hardness is much higher which provides some advantages over gel inks, such as jetting latitude.

The ink of embodiments may further include conventional additives to take advantage of the known functionality associated with such conventional additives. Such additives may include, for example, at least one isocyanate derived material, antioxidant, slip and leveling agents, clarifier, viscosity modifier, adhesive, plasticizer and the like.

The ink vehicle or carrier may also include at least one isocyanate derived material. The isocyanate derived material may be a urethane resin obtained by reacting two equivalents of an alcohol, such as hydroabietyl alcohol and one equivalent of an isocyanate or diisocyanate (isophorone diisocyanate), as disclosed in, for example, Example 1 of U.S. Pat. No. 5,782,966, the disclosure of which is totally incorporated herein by reference in its entirety. The isocyanate derived material may be present in the ink carrier in an amount of from about 2 to about 99 percent or from about 2 to about 90 percent or from about 3 to about 80 percent by weight of the ink carrier. Other suitable isocyanate-derived materials include a urethane resin that was the adduct of three equivalents of stearyl isocyanate and a glycerol-based alcohol, prepared as described in Example 4 of U.S. Pat. No. 6,309,453, the disclosure of which is totally incorporated herein by reference in its entirety.

The ink may optionally contain antioxidants to protect the images from oxidation and also may protect the ink components from oxidation while existing as a heated melt in the ink reservoir. Examples of suitable antioxidants include (1) N,N'-hexamethylene bis(3,5-di-tert-butyl-4-hydroxy hydrocinnamamide) (IRGANOX 1098, available from Ciba Inc.), (2) 2,2-bis(4-(2-(3,5-di-tert-butyl-4-hydroxyhydrocinnamoyloxy)) ethoxyphenyl)propane (TOPANOL-205, available from ICI America Corporation), (3) tris(4-tert-butyl-3-hydroxy-2,6-dimethyl benzyl)isocyanurate (CYANOX 1790, 41, 322-4, LTDP, Aldrich D12, 840-6), (4) 2,2'-ethylidene bis(4,6-di-tert-butylphenyl)fluoro phosphonite (ETHANOX-398, available from Ethyl Corporation), (5) tetrakis(2,4-di-tert-butylphenyl)-4,4'-biphenyl diphosphonite (ALDRICH 46, 852-5; hardness value 90), (6) pentaerythritol tetrastearate (TCI America #PO739), (7) tributylammonium hypophosphite (Aldrich 42,009-3), (8) 2,6-di-tert-butyl-4-methoxyphenol (Aldrich 25,106-2), (9) 2,4-di-tert-butyl-6-(4-methoxybenzyl)phenol (Aldrich 23,008-1), (10) 4-bromo-2,6-dimethylphenol (Aldrich 34,951-8), (11) 4-bromo-3,5-didimethylphenol (Aldrich B6,420-2), (12) 4-bromo-2-nitrophenol (Aldrich 30,987-7), (13) 4-(diethyl aminomethyl)-2,5-dimethylphenol (Aldrich 14,668-4), (14) 3-dimethylaminophenol (Aldrich ID14,400-2), (15) 2-amino-4-tert-amylphenol (Aldrich 41,258-9), (16) 2,6-bis (hydroxymethyl)-p-cresol (Aldrich 22,752-8), (17) 2,2'-methylenediphenol (Aldrich B4,680-8), (18) 5-(diethylamino)-2-nitrosophenol (Aldrich 26,951-4), (19) 2,6-dichloro-4-fluorophenol (Aldrich 28,435-1), (20) 2,6-dibromo fluoro phenol (Aldrich 26,003-7), (21) α-trifluoro-o-creso-1 (Aldrich 21,979-7), (22) 2-bromo-4-fluorophenol (Aldrich 30,246-5), (23) 4-fluorophenol (Aldrich F1,320-7), (24) 4-chlorophenyl-2-chloro-1,1,2-tri-fluoroethyl sulfone (Aldrich 13,823-1), (25) 3,4-difluoro phenylacetic acid (Adrich 29,043-2), (26) 3-fluorophenylacetic acid (Aldrich 24,804-5), (27) 3,5-difluoro phenylacetic acid (Aldrich 29,044-0), (28) 2-fluorophenylacetic acid (Aldrich 20,894-9), (29) 2,5- bis(trifluoromethyl) benzoic acid (Aldrich 32,527-9), (30) ethyl-2-(4-(4-(trifluoromethyl)phenoxy)phenoxy)propionate (Aldrich 25,074-0), (31) tetrakis (2,4-di-tert-butyl phenyl)-4,4'-biphenyl diphosphonite (Aldrich 46,852-5), (32) 4-tert-amyl phenol (Aldrich 15,384-2), (33) 3-(2H-benzotriazol-2-yl)-4-hydroxy phenethylalcohol (Aldrich 43,071-4), NAUGARD 76, NAUGARD 445, NAUGARD 512, AND NAUGARD 524 (manufactured by Chemtura Corporation), and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

The ink may further contain an optional viscosity modifier such as FORAL 85, a glycerol ester of hydrogenated abietic (rosin) acid (commercially available from Eastman), FORAL 105, a pentaerythritol ester of hydroabietic (rosin) acid (commercially available from Eastman), CELLOLYN 21, a hydroabietic (rosin) alcohol ester of phthalic acid (commercially available from Eastman), ARAKAWA KE-311 and KE-100 Resins, triglycerides of hydrogenated abietic (rosin) acid (commercially available from Arakawa Chemical Industries, Ltd.), synthetic polyterpene resins such as NEVTAC 2300, NEVTAC 100, and NEVTACO 80 (commercially available from Neville Chemical Company), WINGTACK 86, a modified synthetic polyterpene resin (commercially available from Sartomer), and the like. Viscosity modifiers may be present in the ink in any effective amount, such as from about 0.01 percent by weight of the ink to from about 98 percent by weight of the ink, from about 0.1 percent by weight of the ink to about 50 percent by weight of the ink, from about 5 weight percent of the ink to about 10 weight percent of the ink.

Adhesives, such as VERSAMID 757, 759, or 744 (commercially available from Cognis) may be present in the ink from about 0.01 percent by weight of the ink to from about 98 percent by weight of the ink, from about 0.1 percent by weight of the ink to about 50 percent by weight of the ink, from about 5 weight percent of the ink to about 10 weight percent of the ink.

Plasticizers such as UNIPLEX 250 (commercially available from Unitex), the phthalate ester plasticizers commercially available from Ferro under the trade name SANTICIZER, such as dioctyl phthalate, diundecyl phthalate, alkylbenzyl phthalate (SANTICIZER 278), triphenyl phosphate (commercially available from Ferro), KP-140, a tributoxyethyl phosphate (commercially available from Great Lakes Chemical Corporation), MORFLEX 150, a dicyclohexyl phthalate (commercially available from Morflex Chemical Company Inc.), trioctyl trimellitate (commercially available from Sigma Aldrich Co.), and the like. Plasticizers may be present in an amount from about 0.01 percent by weight of the ink to from about 98 percent by weight of the ink, from about 0.1 percent by weight of the ink to about 50 percent by weight of the ink, from about 5 weight percent of the ink to about 10 weight percent of the ink.

When present, the optional additives may each, or in combination, be present in the ink in any desired or effective amount, such as from about 1 percent to about 10 percent by weight of the ink or from about 3 percent to about 5 percent by weight of the ink.

In embodiments, the phase change ink compositions described herein also may include a colorant for general raised print applications. Any desired or effective colorant can be employed in the phase change ink compositions, including dyes, pigments, mixtures thereof, and the like, provided that the colorant can be dissolved or dispersed in the ink carrier. Any dye or pigment may be chosen, provided that it is capable of being dispersed or dissolved in the ink carrier and is compatible with the other ink components. The phase change carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Ciba); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol Brilliant Yellow 4GF (Clariant); Cibanon Yellow 2GN (Ciba); Orasol Black CN (Ciba); Savinyl Black RLSN (Clariant); Pyrazol Black BG (Clariant); Morfast Black 101 (Rohm & Haas); Diaazol Black RN (ICI); Orasol Blue GN (Ciba); Savinyl Blue GLS (Clariant); Luxol Fast Blue MBSN (Pylam Products); Sevron Blue 5GMF (Classic Dyestuffs); Basacid Blue 750 (BASF), Neozapon Black X51 (BASF), Classic Solvent Black 7 (Classic Dyestuffs), Sudan Blue 670 (C.I. 61554) (BASF), Sudan Yellow 146 (C.I. 12700) (BASF), Sudan Red 462 (C.I. 26050) (BASF), C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like, Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Pigments are also suitable colorants for the phase change inks. Examples of suitable pigments include PALIOGEN Violet 5100 (commercially available from BASF); PALIOGEN Violet 5890 (commercially available from BASF); HELIOGEN Green L8730 (commercially available from BASF); LITHOL Scarlet D3700 (commercially available from BASE); SUNFAST Blue 15:4 (commercially available from Sun Chemical); Hostaperm Blue B2G-D (commercially available from Clariant); Hostaperm Blue B4G (commercially available from Clariant); Permanent Red P-F7RK; Hostaperm Violet BL (commercially available from Clariant); LITHOL Scarlet 4440 (commercially available from BASF); Bon Red C (commercially available from Dominion Color Company); ORACET Pink RE (commercially available from Ciba); PALIOGEN Red 3871 K (commercially available from BASF); SUNFAST Blue 15:3 (commercially available from Sun Chemical); PALIOGEN Red 3340 (commercially available from BASF); SUNFAST Carbazole Violet 23 (commercially available from Sun Chemical); LITHOL Fast Scarlet L4300 (commercially available from BASE); SUNBRITE Yellow 17 (commercially available from Sun Chemical); HELIOGEN Blue L6900, L7020 (commercially available from BASF); SUNBRITE Yellow 74 (commercially available from Sun Chemical); SPECTRA PAC C Orange 16 (commercially available from Sun Chemical); HELIOGEN Blue $K6902_7$, K6910 (commercially available from BASF); SUNFAST Magenta 122 (commercially available from Sun Chemical); HELIOGEN Blue D6840, D7080 (commercially available from BASF); Sudan Blue OS (commercially available from BASE); NEOPEN Blue FF4012 (commercially available from BASF); PV Fast Blue B2GO1 (commercially available from Clariant); IRGALITE Blue BCA (commercially available from Ciba); PALIOGEN Blue 6470 (commercially available from BASE); Sudan Orange G (commercially available from Aldrich), Sudan Orange 220 (commercially available from BASF); PALIOGEN Orange 3040 (BASF); PALIOGEN Yellow 152, 1560 (commercially available from BASF); LITHOL Fast Yellow 0991 K (commercially available from BASE); PALIOTOL Yellow 1840 (commercially available from BASF); NOVOPERM Yellow FGL (commercially available from Clariant); Ink Jet Yellow 4G VP2532 (commercially available from Clariant); Toner Yellow HG (commercially available from Clariant); Lumogen Yellow D0790 (commercially available from BASE); Suco-Yellow L1250 (commercially available from BASF); Suco-Yellow D1355 (commercially available from BASF); Suco Fast Yellow D1355, D1351 (commercially available from BASF); HOSTAPERM Pink E 02 (commercially available from Clariant); Hansa Brilliant Yellow 5GX03 (commercially available from Clariant); Permanent Yellow GRL 02 (commercially available from Clariant); Permanent Rubine L6B 05 (commercially available from Clariant); FANAL Pink D4830 (commercially available from BASF); CINQUASIA Magenta (commercially available from DU PONT); PALIOGEN Black L0084 (commercially available from BASF); Pigment Black K801 (commercially available from BASF); and carbon blacks such as REGAL 330™ (commercially available from Cabot), Nipex 150 (commercially available from Degusssa) Carbon Black 5250 and Carbon Black 5750 (commercially available from Columbia Chemical), and the like, as well as mixtures thereof.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, the disclosures of each of which are incorporated herein by reference in their entirety.

In embodiments, solvent dyes are employed. An example of a solvent dye suitable for use herein may include spirit soluble dyes because of their compatibility with the ink carriers disclosed herein. Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 260501] (BASF), mixtures thereof and the like.

The colorant may be present in the phase change ink in any desired or effective amount to obtain the desired color or hue such as, for example, at least from about 0.1 percent by weight of the ink to about 50 percent by weight of the ink, at least from about 0.2 percent by weight of the ink to about 20 percent by weight of the ink, and at least from about 0.5 percent by weight of the ink to about 10 percent by weight of the ink.

The ink compositions can be prepared by any desired or suitable method. For example, each of the components of the ink carrier can be mixed together, followed by heating, the mixture to at least its melting point, for example from about 60° C. to about 110° C., 80° C. to about 100° C. and 85° C. to about 95° C. The colorant may be added before the ink ingredients have been heated or after the ink ingredients have been heated. When pigments are the selected colorants, the molten mixture may be subjected to grinding in an attritor or ball mill apparatus to effect dispersion of the pigment in the ink carrier. The heated mixture is then stirred for about 5 seconds to about 10 minutes or more, to obtain a substantially homogeneous, uniform melt, followed by cooling the ink to ambient temperature (typically from about 20° C. to about 25° C.). The inks are solid at ambient temperature. In a specific embodiment, during the formation process, the inks in their molten state are poured into molds and then allowed to cool and solidify to form ink sticks. Suitable ink preparation techniques are disclosed in U.S. Pat. No. 7,186,762, the disclosure of which is incorporated herein by reference in its entirety.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX 4200 papers, XEROX Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX Digital Color Gloss, Sappi Warren Papers LUSTROGLOSS, specialty papers such as Xerox DURAPAPER, and the like, transparency materials, fabrics, textile products, plastics, polymeric films, inorganic recording mediums such as metals and wood, and the like, transparency materials, fabrics, textile products, plastics, polymeric films, inorganic substrates such as metals and wood, and the like.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Preparation of Solid Inks
Materials

Figure 3:
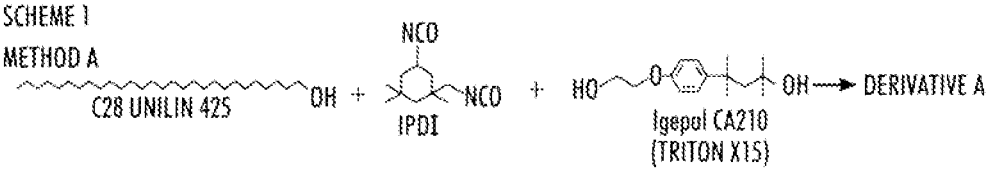
FIG. 3 is an illustration of the synthesis of various Igepal derivatives used in the solid inks according to the present embodiments.
Figure 3:
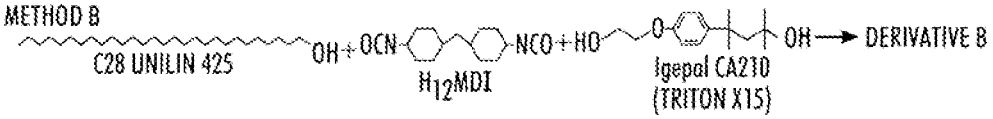
Figure 3:
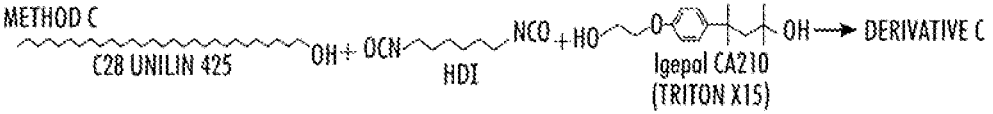
Figure 3:
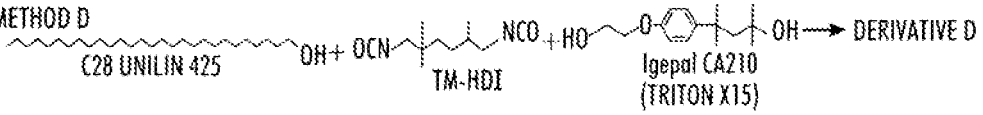
Figure 3:
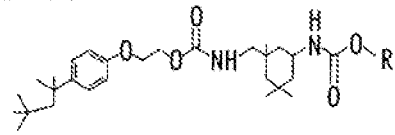
Figure 3:
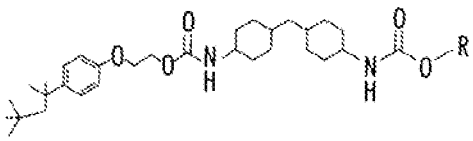
Figure 3:
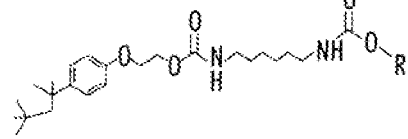
Figure 3:
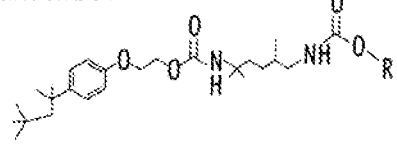

The inks were formulated using non-curable components and both commercial resin Licowax-KFO and the Igepal custom materials. In one embodiment, the non-curable component of the present embodiments, present in the range of 20 to 50 percent in the ink, is an Igepal CA210 derivative or mixture of Igepal CA210 derivatives selected from the options shown in FIG. 3. Each horizontal line represents reactant mixture that are used for the synthesis of the Igepal derivatives that can be used for the curable solid inks of the present embodiments.

For the curable components, the monomers selected for the present embodiments are CD-406 from Sartomer, a dimethanol diacrylate cyclohexane difunctional monomer (mp=78° C.); SR-368, an isocyanurate triacrylate trifunctional monomer (mp=50-55° C.); CD587 a behenyl acrylate monofunctional monomer C18, C20, C22 mixture (mp=55° C.); Unilin 350, and an acrylate curable monofunctional acrylate wax C22, C23, C24 mixture (mp=50-60° C.).

For the photoinitiator package, the components are: Irgacure 819 (Bis acyl phosphine (BAPO)), Irgacure 184 (α-hydroxyketone), Irgacure 379 α-hydroxyketone) and Irgacure 907 (α-aminoketone) (available from Ciba Specialty Chemicals).

Colorless curable solid inks were formulated to demonstrate the benefits of the present embodiments. Table 1 illustrates the formulation of these inks.

TABLE 1

| | Weight % | | |
|---|---|---|---|
| Component | Ink 1 (Licowax-KFO) | Ink 2 (Igepal A) | Ink 3 (Igepal D) |
| Monomer | | | |
| CD406 | 20.81 | 20.81 | 20.81 |
| SR368 | 10.38 | 10.38 | 10.38 |
| CD587 | 29.31 | 29.31 | 29.31 |
| Curable Wax | | | |
| Unilin 350 Acrylate | 8.50 | 8.50 | 8.50 |
| Non-curable Wax | | | |
| Igepal IPDI Unilin 425 | 0.00 | 25.22 | 0.00 |
| Igepal TMHDI Unilin 425 | 0.00 | 0.00 | 25.06 |
| Licowax-KFO | 25.22 | 0.00 | 0.00 |
| Photoinitiator | | | |
| Irgacure 819 | 1.60 | 1.55 | 1.60 |
| Irgacure 184 | 2.30 | 2.23 | 2.30 |
| Irgacure 379 | 0.00 | 1.00 | 0.00 |
| Irgacure 907 | 1.03 | 1.00 | 1.03 |
| Total | 100 | 100 | 100 |

Procedure

Into a 30 mL amber glass bottle, the components were added for each solid ink in proportion according to Table 1 in the following order: CD406, SR368, CD587, Unilin 350 Acrylate, Licowax KFO or Igepal A, Irgacure 819, Irgacure 184, Irgacure 379 and Irgacure 907, to obtain a total of 10 g of ink. To this 10 g mixture was added a stir bar and the mixture was placed in a Variomag reaction block. The ink mixture was heated and stirred at about 90° C., and 300 RPM respectively for at least 20 minutes or until the mixture appeared homogeneous. The temperature was increased to 100° C. for about 5 minutes. The mixture was brought back down to 90° C. and left to stir for 90 minutes.

Hardness Measurement

The pre- and post-cure hardness of the ink vehicles were obtained with a PTC Durometer. As a reference, on this instrument, the hardness of a conventional solid ink for comparison (ColorQube) is 67.

Cure Rate Measurement

The cure rate was obtained by measuring the variation of hardness versus ultraviolet (UV) light exposure. A 600W Fusion UV Systems Inc. Lighthammer equipped with a D-bulb was used to irradiate the vehicles and hardness was measured after specific exposure times. The hardness versus cure speed (s/ft) plot was used to obtain the initial curing rate for the ink vehicle.

Figure 4:
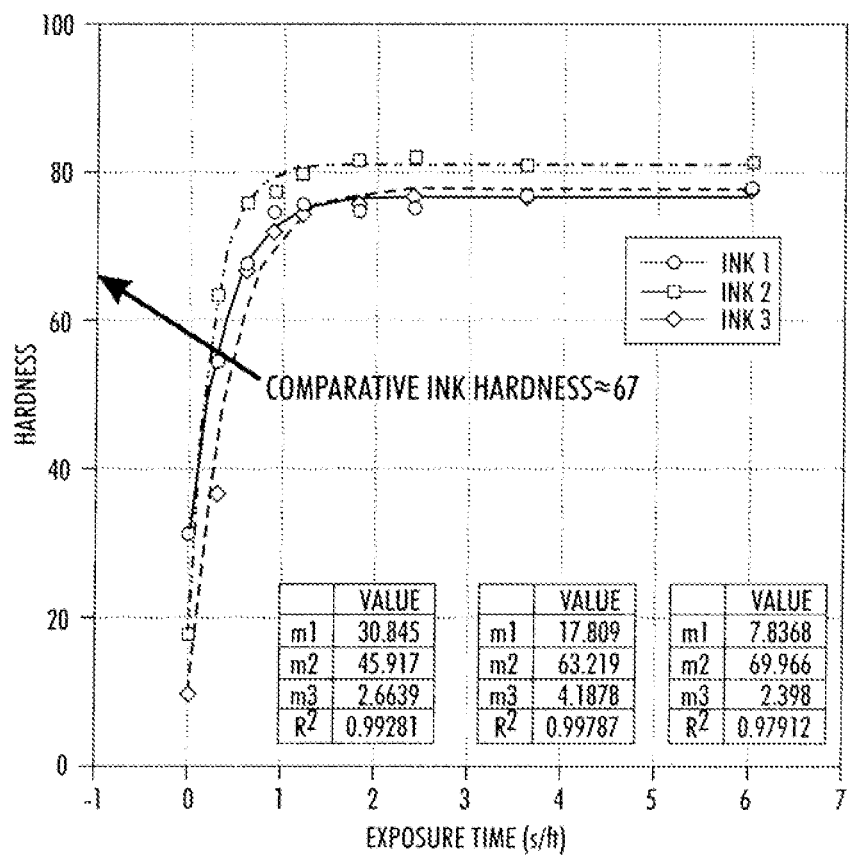
FIG. 4 is a graph illustrating a plot of hardness versus exposure time for the solid inks according to the present embodiments.

The pre-cure or initial hardness (t=0), curing rate (initial slope), and hardness after cure (final hardness) are shown in FIG. 4. Viscosity and volume contraction data were also obtained for all of the inks and are shown in Table 2.

TABLE 2

| Measurement Responses | Ink 1 (Licowax-KFO) | Ink 2 (Igepal A) | Ink 3 (Igepal D) |
|---|---|---|---|
| Pre-cured Hardness | 30.9 | 17.8 | 7.8 |
| Post-cured Hardness | 76.8 | 81.0 | 77.8 |
| Initial Slope | 122.3 | 264.8 | 167.8 |
| Viscosity at 90° C. (cP) | 8.90 | 9.24 | 8.66 |
| Volume Contraction (%) | 4.53 | 1.16 | 2.14 |

Hardness and curing rate data were obtained from Hardness vs Exposure Time plots using following expressions:

$$y = m_1 + m_2 \cdot (1 - \exp(-m_3 \cdot x))$$

$$\text{Initial Hardness} = m_1 \quad \text{Initial Slope} = m_2 \cdot m_3$$

$$\text{Final Hardness} = m_1 + m_2.$$

The curing rate of the inks of the Igepal-containing inks (Inks 2 and 3) was found to be greater than 165 ft/s, a more than 50% improvement over the Licowax-FKO ink (Ink 1) but, despite differences in cure rate, all ink formulations were considerably harder than the Comparative Ink (ColorQube) (67 ft/s) following cure.

To further demonstrate the unexpected results of the present embodiments, two inks containing different amounts of Igepal-IPDI-Unilin 425 resin (Igepal A) were formulated for printing evaluation. About 120 g of this ink was formulated in the manner described above except that a colorant was added to this formulation. The formulations of these curable solid inks are illustrated in Table 3.

TABLE 3

| Monomer | Ink 4a | Ink 4b | SUM | Wt % |
|---|---|---|---|---|
| CD406 | 17.317 | 17.317 | 34.633 | 28.861 |
| SR368 | 1.347 | 1.347 | 1.347 | 2.244 |
| CD587 | 10.549 | 10.549 | 21.097 | 17.581 |
| Curable Wax | | | | |
| Unilin 350 Acrylate | 4.998 | 4.998 | 9.996 | 36.142 |
| Non-curable Wax | | | | |
| Igepal A | 21.685 | 21.685 | 43.371 | 36.142 |
| Photoinitiator | | | | |
| Irgacure 819 | 0.941 | 0.941 | 1.882 | 1.568 |
| Irgacure 184 | 1.358 | 1.358 | 2.717 | 2.264 |
| Irgacure 907 | 0.606 | 0.606 | 1.211 | 1.009 |
| Colorant | | | | |
| Blue Olefin Dye | 1.200 | 1.200 | 2.400 | 2.000 |
| Total | 60.00 | 60.00 | 120.00 | 100 |
| Monomer | Ink 5a | Ink 5b | SUM | Wt % |
| CD406 | 12.360 | 12.360 | 24.720 | 20.600 |
| SR368 | 6.150 | 6.150 | 12.300 | 10.250 |
| CD587 | 17.406 | 17.406 | 34.812 | 29.010 |
| Curable Wax | | | | |
| Unilin 350 Acrylate | 4.998 | 4.998 | 9.996 | 8.330 |
| Non-curable Wax | | | | |
| Igepal A | 14.982 | 14.982 | 29.964 | 24.970 |

TABLE 3-continued

| Photoinitiator | | | | |
|---|---|---|---|---|
| Irgacure 819 | 0.942 | 0.942 | 1.884 | 1.570 |
| Irgacure 184 | 1.356 | 1.356 | 2.712 | 2.260 |
| Irgacure 907 | 0.606 | 0.606 | 1.212 | 1.010 |
| Colorant | | | | |
| Blue Olefin Dye | 1.200 | 1.200 | 2.400 | 2.000 |
| Total | 60.00 | 60.00 | 120.00 | 100 |

Figure 5A:
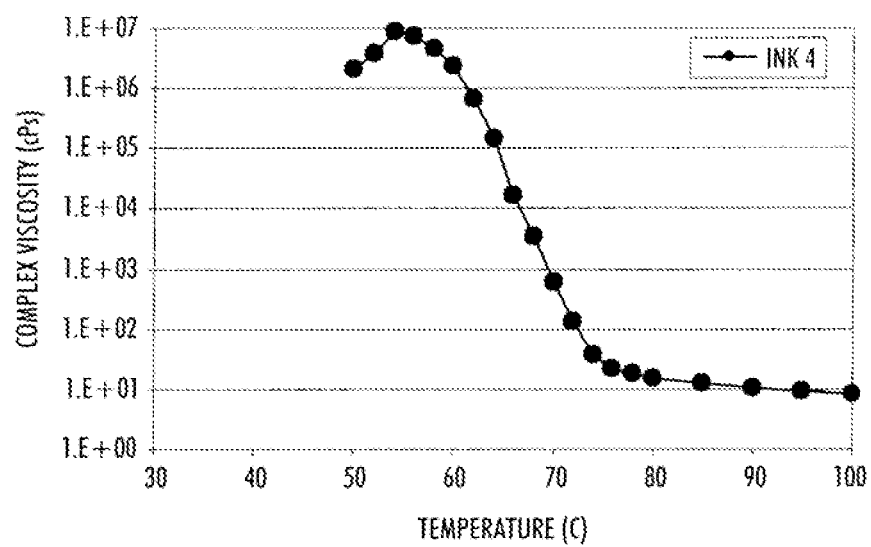
FIG. 5A is a graph illustrating complex viscosity versus temperature of a solid ink according to the present embodiments.
Figure 5B:
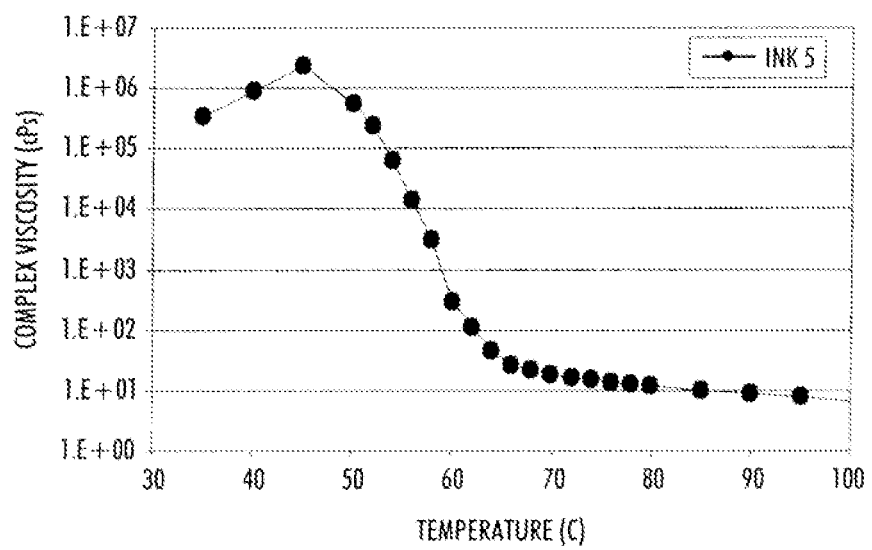
FIG. 5B is a graph illustrating complex viscosity versus temperature of alternative solid ink according to the present embodiments.

The rheology was measured (FIGS. 5A and 5B) and confirms that the formulations of Inks 4 and 5 have jettable viscosities above about 70° C. As shown, complex viscosity versus temperature of Ink 4 (FIG. 5A) and Ink 5 (FIG. 5B) show jettable viscosities above about 70° C. The measurements were taken using an RFS3 strain-controlled rheometer from TA Instruments.

Braille Printing Demonstration

Figure 6:
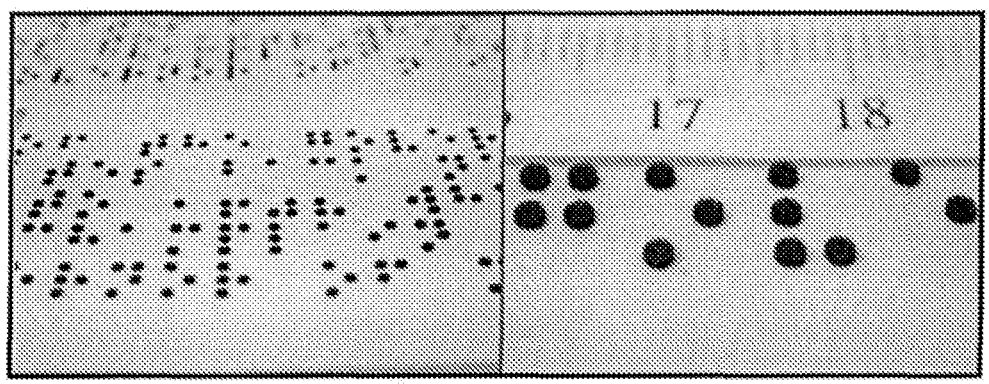
FIG. 6 is a photograph showing Braille text produced digitally using inkjet and the solid inks according to the present embodiments.

The Braille text in FIG. 6 was generated digitally using a modified PHASER® 8860 printing at 36 Khz, 95° C. and the prints were cured offline using a 600W Fusion UV Systems Inc. Lighthammer equipped with a D-bulb. Inline curing could also be used in combination with any UV light source such as a mercury lamp or LED. As seen below, the printer was easily able to produce dots of a height which match or even exceed the minimum requirement set by the National Library For The Blind And Physically Handicapped Materials Development Center as set forth at http://www.brailleplus.net/visually_impaired_resources/Glossary/American_Braille_Technical_Specifications/. The American Braille Technical Specifications for printing are:

Dot height: 0.020 inches (0.508 mm)
Dot spacing: 0.09 inches (2.286 mm)
Character spacing: 0.240 inches (6.096 mm)
Line height: 0.40 inches (10.16 mm)

The printed dots, as shown in FIG. 6, are resistant to damage by touch as compared to embossed dots from a commercially available embossed print or dots produced with conventional inks, such as ColorQube solid ink, which are observed to flake easily off of the page. Similarly, the curable solid ink of the present embodiments can also be used generate raised text and images including relief prints. These images and documents can be UV cured by a one-time exposure or through multiple exposures. In another embodiment, the Braille prints are built in the Z-direction with inks of different colors or mixture of colored and colorless inks (e.g., colorless inks on top of a cyan ink, facilitating efficient deep curing and color enhanced documents and grey level printing for relief printing applications).

Summary

In summary, the present embodiments provide curable solid inks and low shrinkage curable solid inks which, not only retain the advantages of handling and safety associated with conventional phase change solid inks and curable solid inks formulated with commercial resins but, further provide additional breakthrough performance with respect to robustness making them highly suitable for use in producing Braille and raised text applications. In addition, the inks of the present embodiments have the advantage over inks of other known inks as the ink loading and delivery used in the current XEROX inkjet printer does not have to be modified when used with the present embodiments. Thus, the inks of the present embodiments can be used in a dual mode printer that can print both normal prints and Braille/raised print without complicated or expensive modifications. For example, there is no need for a physical embosser and the height of the dots or raised text is adjustable. This benefit to the present embodiments is due to the fact that the inks of the present embodiments are solid enough before cure, so one can digitally built multilayers on a substrate prior to final cure or alternatively pinning (partial curing) can be used for each layer as it is deposited. Both approaches require minimal physical modifications to commercial solid ink printers and since the number of layers being printed are controlled by software, one can either print one layer (normal print) or multilayers (Braille). In addition, the dots or raised text can be colored to convey additional information to non-blind individuals (e.g., digital embossing). When colored images are not required, all four color stations (C, M, Y, K) can be used to build the Braille image thus providing increased printing speed or additional flexibility with respect printing the bottom, intermediate and top layer of the Braille image, e.g. an adhesive could be included in the layer that will be in contact with the substrate while the top layer may be formulated to have increased smear resistance.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. An ink jet printing device comprising:
an ink jet print head and a print region surface toward which ink is jetted from the ink jet print head, wherein a height distance between the ink jet print head and the print substrate is adjustable; and further wherein the ink jet print head jets a curable solid ink comprising an ink vehicle, one or more waxes, and a photoinitiator, wherein the curable solid ink has a hardness after curing of greater than 70, a shrinkage value of less than 5, and a pre-cure hardness greater than 5 and less than 50; and further wherein a print deposited upon the print substrate is Braille, digital embossing raised print, or a combination of regular print and one or more of Braille, digital embossing and raised print.

2. A method of jet printing raised text, comprising:
jetting a curable solid ink onto a print substrate to form an image comprising raised text; and
exposing the image to radiation having wavelengths in the range of from about 4 nanometers to about 500 nanometers to cure the curable solid ink on to the print substrate, wherein the curable solid ink comprises: an ink vehicle, one or more waxes, and a photoinitiator, wherein the curable solid ink has a hardness after curing of greater than 70, a shrinkage value of less than 5 and a pre-cure hardness greater than 5 and less than 50.

3. The method of claim 2, wherein the curable solid ink has a hardness after curing of from about 70 to about 90.

4. The method of claim 3, wherein the curable solid ink has a hardness after curing of from about 75 to about 85.

5. The method of claim 2, wherein the curable solid ink has a viscosity of less than 10 cPs at 90° C.

6. The method of claim 2, wherein the jetting step is performed at above 70° C.

7. The method of claim 2, wherein the print substrate is selected from the group consisting of plain paper, ruled notebook paper, bond paper, silica coated paper, glossy coated paper, transparency materials, fabrics, textile products, plastics, polymeric films, metal, and wood.

8. The method of claim 2, wherein the raised text is Braille, digital embossing, raised print, or a combination of regular print and one or more of Braille, digital embossing and raised print.

9. The method of claim 2, wherein the raised text has a height of at least about 0.508 mm.

10. The method of claim 9, wherein the raised text has a height of from about 0.1 to about 0.8 mm.

* * * * *